Dec. 7, 1926.    1,609,536
A. C. CARLSON
TOY VEHICLE
Filed Nov. 10, 1923    2 Sheets-Sheet 1
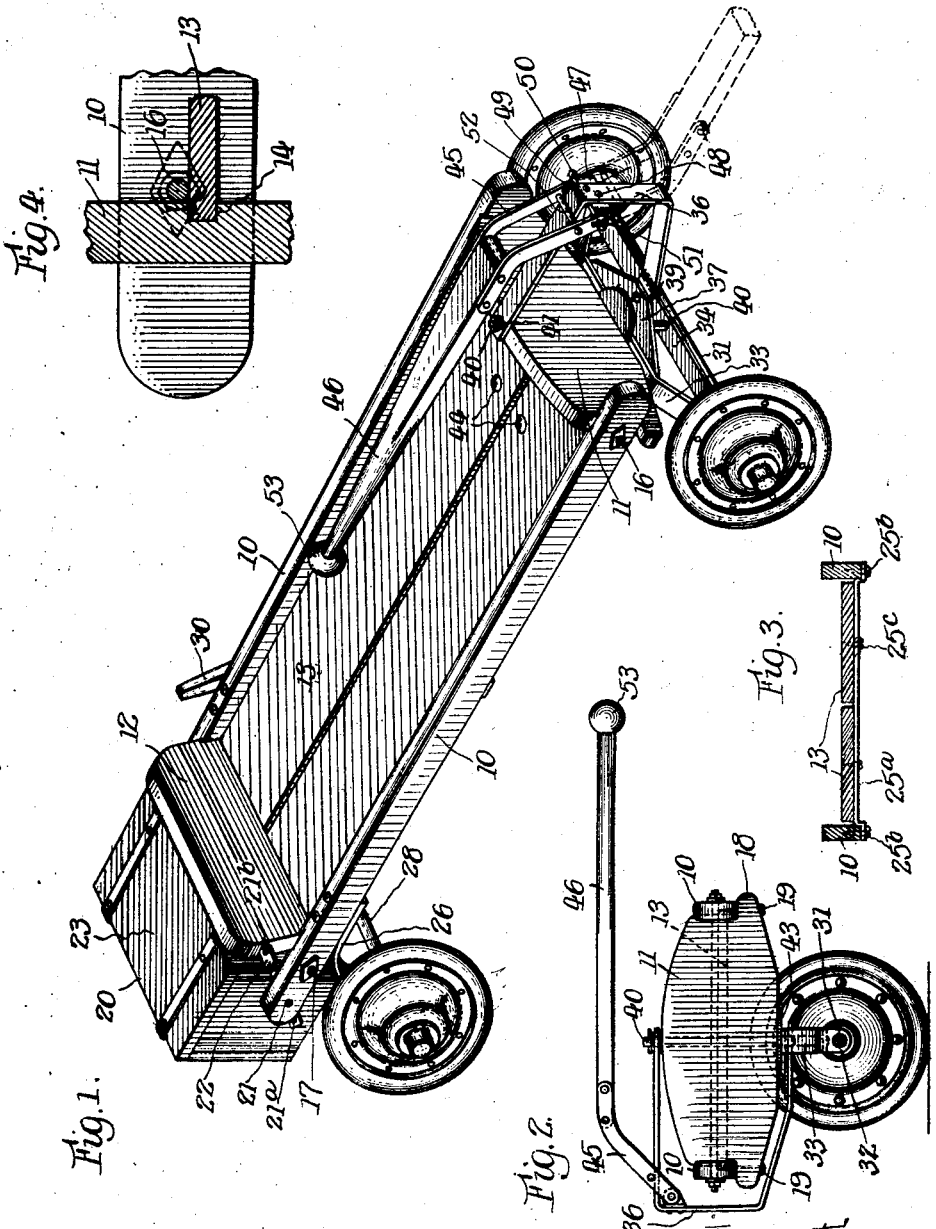
Inventor:
Artie C. Carlson, Dec. 7, 1926.　　　　　　　　　　　　　　　　　　　1,609,536
A. C. CARLSON
TOY VEHICLE
Filed Nov. 10, 1923　　2 Sheets-Sheet 2
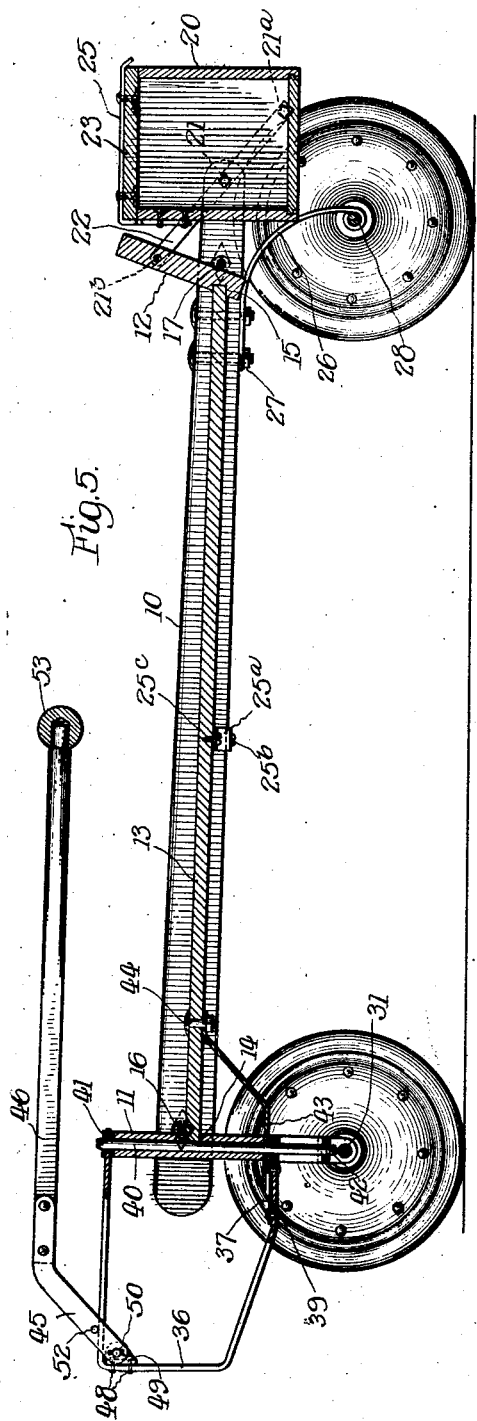
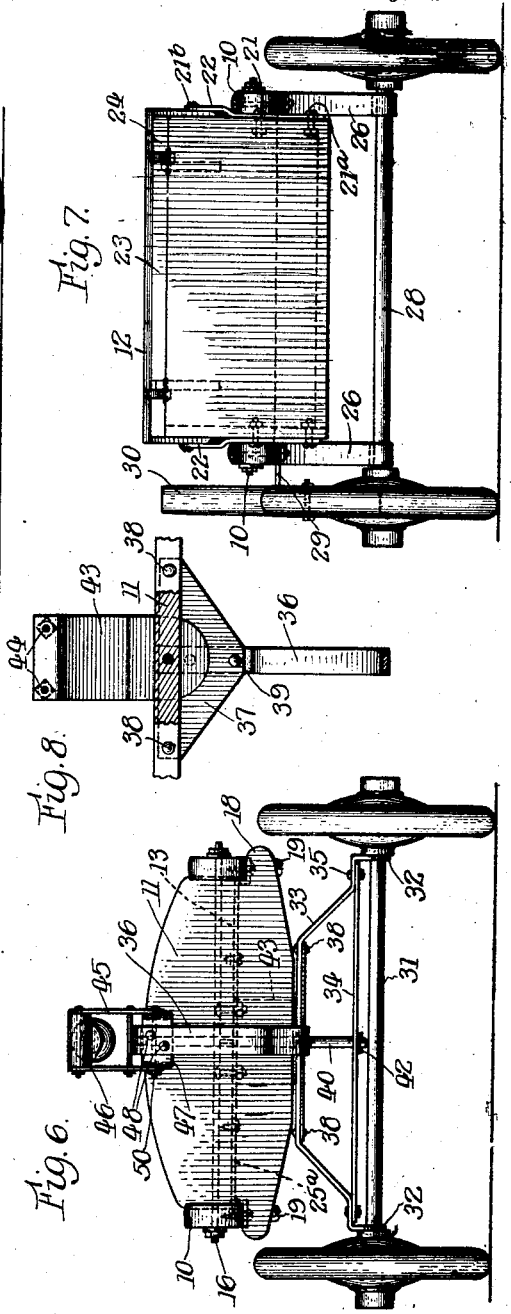
Inventor
Artie C. Carlson Patented Dec. 7, 1926.

1,609,536

UNITED STATES PATENT OFFICE.

ARTIE C. CARLSON, OF VALPARAISO, INDIANA.

TOY VEHICLE.

Application filed November 10, 1923. Serial No. 673,963.

The invention has reference to toy vehicles in general but is more especially concerned with that class of such vehicles commonly termed coasters. Vehicles of this class now in use embody as commonly constructed a body of the box type long used in the construction of toy wagons, with the front and rear wheel suspension means secured to the box bottom. In the use of such a vehicle as a coaster, the child must contend with relatively high side walls, and because the box body prevents the steering handle from extending rearwardly except at a small angle to the vertical, difficulty is encountered in steering the vehicle. Furthermore, the center of gravity of the body and its load is high so that it tips easily; and the construction is not usually very rugged.

The object of my invention generally stated is to produce a toy vehicle which lends itself more readily to use as a coaster than vehicles of this class now on the market in that it avoids the difficulties attending the use of the box type body.

More specifically, an important object is to produce a coaster which combines extreme simplicity in construction with great strength and rigidity.

Another object is to produce a coaster in which the body has the general appearance of a frame simulating the chassis of a motor vehicle, as distinguished from a body of the wagon box type whereby strength and beauty of line is at once apparent.

Still another object is to provide front and rear wheel suspension means for the frame which are secured directly thereto in a manner such as to insure strength and durability together with neatness in appearance.

Another object is to provide a steering gear permitting the steering wheels to be turned through an arc of at least 90 degrees, and which embodies a steering handle which is capable of extending rearwardly over the body in a direction perpendicular to the pivotal axis of the gear.

Another object is to provide an elongated rectangular frame in which the parts are interlocked to insure a sturdy and rigid construction, and in which the side members lend themselves readily to the support of a trunk at the rear of the body.

In the accompanying drawings I have illustrated one embodiment only of my invention, but I contemplate that various changes in construction may be made by those skilled in the art without departing from the spirit and scope of the invention as expressed in the appended claims.

Figure 1 of the drawings is a perspective view of a toy vehicle constructed in accordance with the said preferred embodiment.

Fig. 2 is a front view of the body illustrating the construction which permits the steering gear to be swung through an arc of 90 degrees or more, the front wheel suspension means being shown in transverse section.

Figs. 3 and 4 are sectional views illustrating details of construction.

Fig. 5 is a longitudinal vertical sectional view through the vehicle.

Fig. 6 is a front elevational view.

Fig. 7 is a rear elevation.

Fig. 8 is a fragmentary elevation section showing a further detail of construction.

The vehicle body comprises a pair of longitudinal side rails 10 and front and rear end pieces 11 and 12, arranged to form an elongated substantially rectangular frame. The frame may be constructed entirely of wood, the parts being made relatively heavy so as to provide ample strength.

Within the frame between the side rails and end pieces is secured in the present instance a pair of boards 13 providing a rest for the knee of the user or a seat when the vehicle is drawn as a cart or wagon. Said boards 13 are set down in the frame a short distance below the upper edges of the side rails, and the latter are made relatively narrow and tapering toward the rear end, with their upper edges slightly rounded, so as to be capable of being gripped conveniently by a child seated upon the vehicle.

In securing the parts of the body together I provide in the present embodiment an interlocked construction. Thus I form in the front and end pieces of the frame horizontal grooves 14 and 15 adapted to receive the front and rear ends of the boards 13, and near the front and rear ends of the side rails I provide upright grooves to receive the ends of the end pieces. Tie rods 16 and 17 between the side rails at the front and rear ends of the frame serve to hold the parts interlocked. As shown in Figs. 2 and 6, the front end piece of the frame is shaped to provide outwardly extending lugs 18 providing shoulders upon their upper surfaces upon which the forward ends of the side rails 10 rest. The rails are secured to these lugs as by means of screws 19. The rear end piece is inclined rearwardly as shown in Fig. 5 so as to form a convenient back rest or push board depending upon whether the vehicle is employed as a cart or wagon or as a coaster.

The tapering side rails of the body may conveniently be extended rearwardly beyond the rear end piece 12 as shown in Fig. 5 to provide a support for a combined seat and trunk 20 at the rear end of the body. As shown, the trunk is entered between the rear ends of the side rails and rigidly fastened thereto as by means of bolts 21. A pair of brace bars 22 may be secured upon opposite sides of the trunk by means of the bolts 21, the lower ends of the bars being extended near to the rear edge of the trunk and secured thereto by bolts 21$^a$, while the upper ends of said brace bars are extended upwardly for connection with the rear end piece 12 of the frame by screws 21$^b$. It will be observed that these members 22 serve to brace the end piece 12 against rearward thrusts as well as to prevent the trunk from tilting on the bolts 21.

A top board 23 hinged at 24 (Fig. 7) to the front side of the trunk provides a cover for the trunk as well as a seat. As shown the hinge straps 25 extend across the top of the top piece 23 to reinforce it, and project from the rear edge of the top piece to form finger pieces.

Substantially midway between the front and rear end pieces of the frame I provide an additional cross piece 25$^a$ which may be in the form of a metal strap secured at its opposite ends to the side rails at the underside thereof as by means of screws 25$^b$. This cross piece provides a support for the boards 13 thus rendering it possible to use lighter weight material therein. Moreover, the two boards may be held in spaced relation by means of screws 25$^c$ entered through the strap into the boards from their under sides.

The rear wheel suspension means comprises a pair of arms 26, secured directly to the under side of the side rails 10 as by means of bolts 27, and curved rearwardly and downwardly to support the rear axle 28. These arms are usually made from spring steel and their lower ends are bent to form sleeves having an internal diameter slightly less than the external diameter of the rod forming the axle so that when the latter is driven through the sleeves the latter effectively grip the rod and hold it against sliding or turning. It will be seen that the arms 26 being made of spring steel provide a resilient support for the rear end of the body.

The bolts 27 for securing the arm 26 upon one side of the body (preferably the left) may conveniently be employed to fasten to the side rail an angular bracket 29 upon which is pivotally mounted a brake lever 30 which is adapted frictionally to engage the adjacent rear supporting wheel.

The front wheel suspension means is secured directly to the front end of the frame through the medium of the front end piece 11. Referring to Fig. 6, the front axle 31 is mounted in a pair of depending ears 32 rigid with the opposite ends of a truss frame consisting of an upper arch member 33 and a lower tie member 34 rigidly secured at its ends to the upper member as by means of rivets 35. The ears 32 may be formed integral with the upper member 33 so that they may be shaped in the operation of shaping the latter.

To this truss frame is rigidly secured the lower end of a U-shaped draw bar 36 (Fig. 5) of the steering gear. This is accomplished preferably by means of a gusset plate 37 (Figs. 2 and 8) which is secured upon the under side of the upper member 33 as by means of rivets 38, the lower end of the draw bar 36 being riveted to this gusset plate as at 39. The upper member 33 and tie bar 34 are, as shown in Fig. 6, spaced a substantial distance apart and these bars provide spaced bearings for the king pin 40. The latter passes vertically through the front piece 11 of the frame preferably with a snug fit (Fig. 5). The upper portion of the draw bar frame 36 extends rearwardly over the top of the front piece 11 and pivots upon the king pin, the latter being secured in position by means of cotter pins 41 and 42 at its upper and lower ends.

To provide a fifth wheel upon which the steering gear may turn, I employ a plate 43 bearing directly upon the lower edge of the front piece. This plate is of substantial width and is rounded at its forward end as shown in Fig. 8. At the rear of the front piece the plate extends upwardly and rearwardly for connection with the bottom boards 13, as shown clearly in Fig. 5, being secured to both boards as by means of a pair of bolts 44. It will be observed that the draw bar 36 bears directly upon the king pin both at its upper and at its lower ends so that said frame is capable of serving as a bumper, the rearward thrust being transmitted through the king pin and plate 43 to the body. It will be observed that the king pin by reason of the construction employed serves to reinforce the front end piece.

The steering handle is pivoted upon the draw bar 36 near the upper portion thereof, and the arrangement is such that it extends rearwardly directly over the body substantially perpendicularly with respect to the axis of the king pin. In the present instance the handle comprises a pair of bent arms 45 secured upon opposite sides of a handle bar or tongue 46 which is of a length such as to extend a substantial distance over the body. The forward end of the tongue 46 may be made of substantial width and the arms 45 correspondingly spaced apart so that when connected with the draw bar the handle exerts an increased leverage on the latter. Said connection comprises, in the present instance a U-shaped bracket 47 (Fig. 1) riveted to the frame as at 48 and providing rearwardly extending lugs 49 to which the forward ends of the arms 45 are pivotally secured as by means of a pin 50 held in place as by means of cotter pins 51 so that the handle may be readily detached for purposes of shipment.

The arms 45 are held in spaced relation near their free ends by means of a pin 52 which is so arranged as to engage with the top and front portions of the drawbar and thus constitute a stop for limiting the swinging movements of the handle in both forward and rearward directions.

It will be apparent that since the bracket 47 is located upon the rear side of the frame, it is better able to withstand strain when the vehicle is drawn as a cart or wagon. The tongue 46 tapers toward a point as shown clearly in Fig. 1, and is equipped with a ball at its free end which turns freely in the hand of the child during the steering operation, the ball being made fast to the tongue 46 in any suitable way.

The wheels employed may be of any suitable character, but of a size such that they are capable of turning beneath the body, as shown in Fig. 2, it being observed that this movement of the wheels beneath the body is permitted through an arc of more than 90 degrees by the construction of the draw bar in the form of a frame which is adapted to pass the front corners of the body. Also this draw bar construction coacts with the bent arms 45 and the pin 52 to support the handle in such a way as to extend horizontally forward or rearwardly directly over the body. In the latter position the leverage upon the steering gear exerted by pressure upon the free end of the handle is substantially greater than is the case when the handle extends upwardly and rearwardly at an angle to the axis of the steering gear.

As shown in Fig. 5, the parts are so proportioned that the body has a slight upward inclination, which increases the adaptability of the vehicle to use as a coaster since it is desirable that the knee be slightly elevated. Also, by the use of a frame construction for the body, relatively flat and suspended low, with the rear wheel suspension means secured to the frame at the rear corners thereof, the vehicle has no tendency to roll over or tip.

I claim as my invention:

1. In a toy vehicle, the combination of a substantially rectangular body including a pair of rigid side rails, a rear end piece secured between said side rails forwardly of the rear ends thereof, and a trunk carried by the rearwardly extending portions of the side rails, said trunk having a combined lid and seat member arranged rearwardly of the upper edge of said rear end piece.

2. A toy vehicle having a body in the form of a substantially rectangular elongated frame and including a pair of rigid side rails and a rear end piece entered between the side rails at points spaced slightly forward of their rear ends, a trunk adapted to fit between the rearwardly projecting ends of the side rails and secured thereto, and braces at opposite sides of the trunk secured between their ends to the side rails at the points of suspension of the trunk by the side rails and having their free ends secured respectively to the trunk at points rearwardly of said points of suspension on the side rails and to said rear end piece.

3. In a toy vehicle, the combination of a body comprising a substantially rectangular frame including rigid side rails and a rear end piece, said side rails projecting rearwardly beyond said end piece, a trunk, and means rigidly securing said trunk between the rearwardly projecting portions of the side rails whereby the top of the trunk provides an auxiliary seat.

4. A four wheeled toy vehicle comprising a body including a substantially rectangular frame having grooved rigid side rails of varying vertical cross section, front and rear end pieces positioned between said side rails at their forward and rear ends respectively, one or more boards placed between and independently of the side rails so as to form a knee rest or other support, said front and rear end pieces having grooves adapted to receive the front and rear ends of said boards, and means for securinng the end pieces in the side rail grooves and said supporting boards in position in the end piece grooves.

5. A four wheeled toy vehicle comprising a body including a substantially rectangular frame having rigid side rails and front and rear end pieces entered between said side rails at their forward and rear ends respectively, one or more boards entered between the side rails so as to form a knee rest or other support, said front piece having projections providing shoulders on which the forward ends of the side rails rest, and means for securing the end pieces between the side rails and thereby secure said supporting boards in position in the end pieces.

6. A four-wheeled toy vehicle comprising a body including a substantially rectangular frame having rigid side rails and front and rear end pieces entered between said side rails at their forward and rear ends respectively, one or more boards entered between the side rails so as to form a knee rest or other support, said front and rear end pieces having grooves adapted to receive the front and rear ends of said boards, and means for securing the end pieces between the side rails and thereby secure said supporting boards in position in the end pieces, said side rails having upright grooves at their forward ends adapted to receive the front end piece and also having diagonal grooves near their rear ends in which the rear end piece is positioned.

7. A four-wheeled toy vehicle having a body comprising a pair of side rails, a front end piece positioned vertically, a rear end piece positioned at an angle, and one or more supporting boards entered between the side rails and the end pieces, tie rods connecting the front and rear ends of the opposite side rails, the end pieces having grooves adapted to receive the supporting boards, the arrangement being such that said tie rods are adapted to secure the parts together in interlocked relation.

8. In coaster wagons, a body comprising a pair of rigid side rails tapering toward the rear end, a front end piece between the side rails, a rear end piece between the side rails positioned forward of the rear ends of said rails, a trunk-like box secured to and placed between the rear ends of the side rails, and side braces secured to the rear end piece, the side rails and the trunk.

9. In toy vehicles, a body comprising a substantially rectangular frame including rigid side rails and a sloping rear end piece, said side rails projecting rearwardly beyond the end piece, a trunk-like box, and means for rigidly supporting the box on the rearwardly projecting portions of the side rails.

10. A toy vehicle body comprising a pair of side rails having grooves on their inner faces, a grooved front end piece having projections on which the side rails rest, a grooved rear end piece, both end pieces being positioned between the side rails in the grooves of such rails, which rails extend beyond the rear end piece, one or more supporting boards positioned between the side rails and placed in the grooves of the end pieces, and tie rods connecting the rails near their front and rear ends so as to rigidly hold the parts in assembled relation.

In testimony whereof, I have hereunto affixed my signature.

ARTIE C. CARLSON.